Dec. 19, 1967   W. W. LEVY ETAL   3,359,469
ELECTROSTATIC PINNING METHOD AND COPYBOARD
Filed April 23, 1964   2 Sheets-Sheet 1
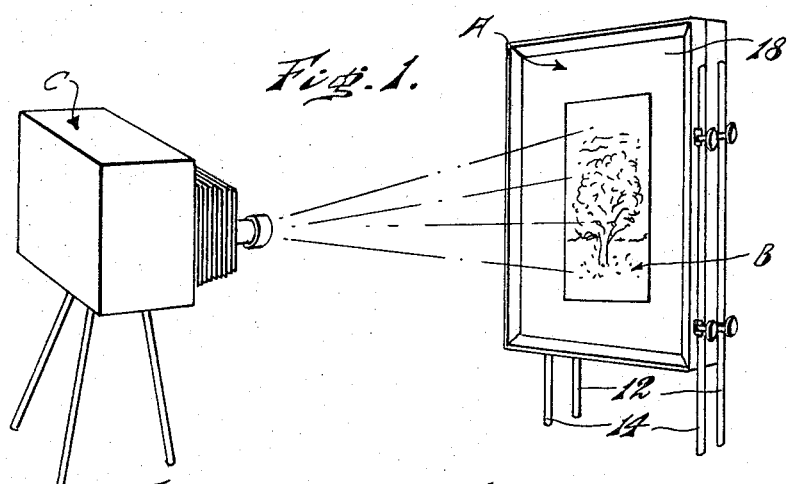
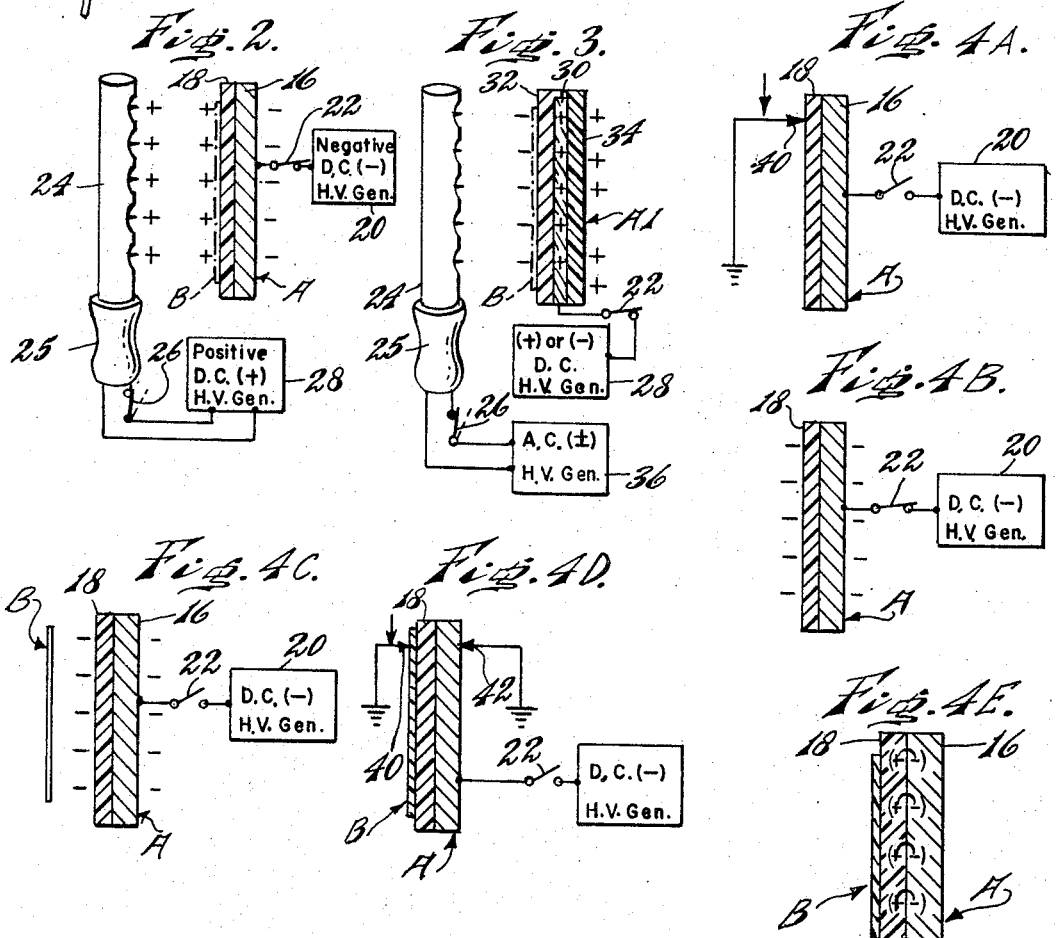
INVENTORS
Warren W. Levy
Harold A. Shwertner
Dolph Simons
ATTORNEYS

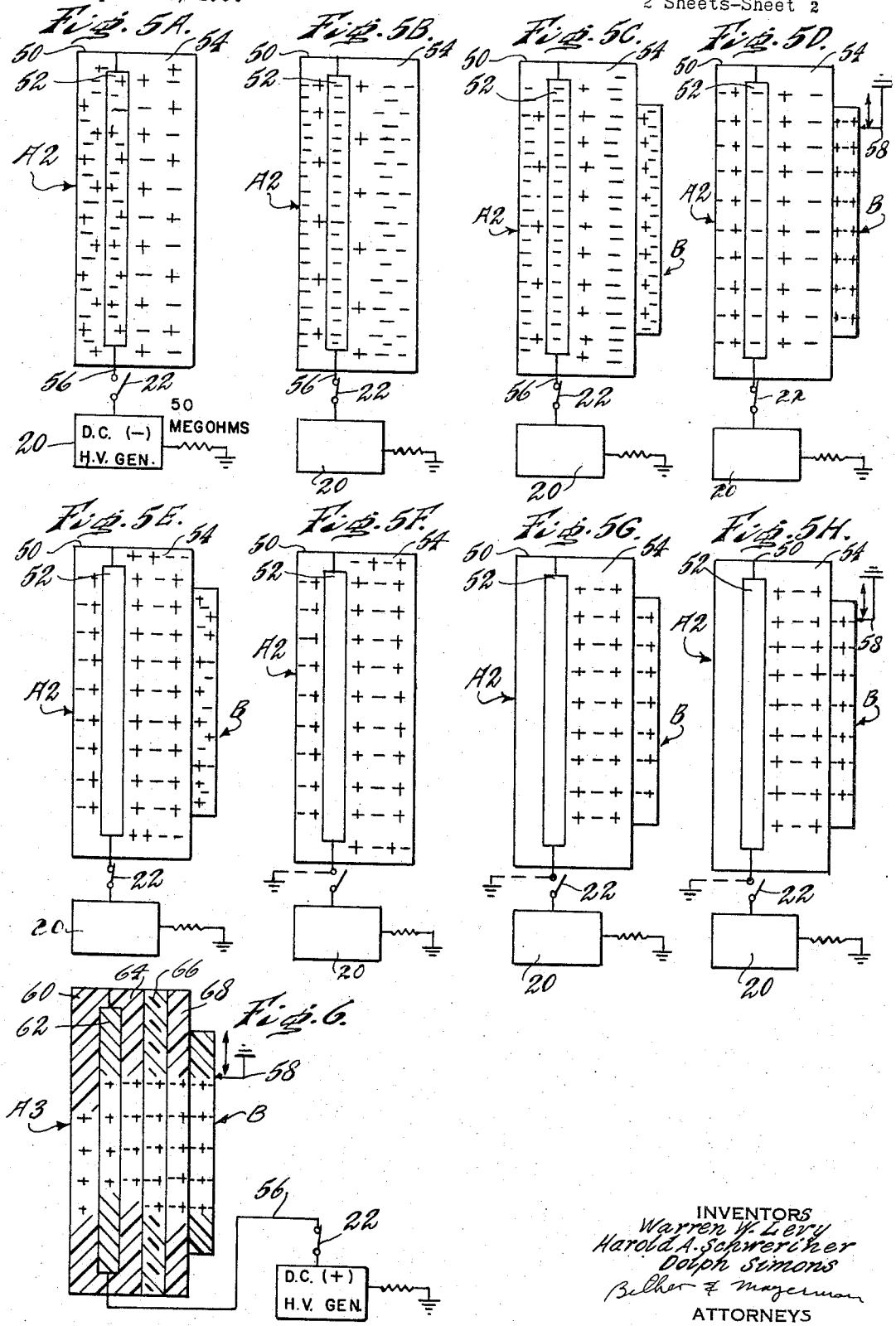

3,359,469
ELECTROSTATIC PINNING METHOD AND
COPYBOARD
Warren W. Levy, Bala Cynwyd, Harold A. Schweriner, Lansdale, and Dolph Simons, Philadelphia, Pa., assignors to The Simco Company, Inc., Lansdale, Pa., a corporation of Pennsylvania
Filed Apr. 23, 1964, Ser. No. 362,049
7 Claims. (Cl. 317—262)

This invention relates to an electrostatic pinning process, and more particularly relates to a copyboard upon the surface of which a sheet of paper, a print, painting or photograph is retained in generally fixed position thereon by electrostatic forces or charges preparatory to photographing.

It is frequently desirable to retain and hold a sheet of paper or other material in fixed position upon a surface without the use of adhesives, pins, tacks or other sticking devices which would be likely to cause damage to a valuable original. For example, in photographic duplication or photolithography, it is necessary to accurately photograph a print or painting upon a sheet of material so that precise registration of the photographic image may occur with respect to other components.

In the past, a usual method for holding down the sheet of material upon the copyboard was by way of a glass or transparent plastic overlay which sandwiched the sheet to be copied against the surface of the board. While the glass or plastic hold-down permitted sliding of the sheet or sheets of materials to be copied wtih respect to each other and the reference copyboard surface, the surfaces of the glass or plastic, transparent as they are, tended to reflect annoying images of illuminating lamps back into the camera. Furthermore, introducing additional refractive materials over the sheet to be photographed had a tendency to interfere with photographic resolution, and the surfaces of the transparent overlays acted as additional dust collectors, at best.

While efforts were made to utilize vacuum hold-down devices, such as foraminous copyboards which communicated with an exhaust pump or chamber, it is readily apparent that the sheet to be held down or pinned had to be the same size as the foraminous surface in order to avoid loss of the pinning vacuum. Note also the likelihood of vacuum holes forming corresponding dimples in the sheet itself.

It is therefore an object of this invention to provide a method for pinning a sheet of material upon a surface without adhesives, pins, vacuum or glass overlays.

Another object of this invention is to provide a copyboard in which the sheet to be copied is retained on the surface thereof by electrostatic forces.

Still another object of this invention is to provide an electrostatic copyboard wherein a sheet pinned thereto will have its exterior surface directly exposed to the camera without intermediate overlays whereby superior quality photographic images will result.

Yet another object of this invention is to provide an electrostatic copyboard wherein multiple reflections will be avoided.

A further object of this invention is to provide an electrostatic copyboard which will permit accurate registration and maximum freedom of orientation with respect to each other of the materials to be copied.

A still further object of this invention is to provide an electrostatic pinning method in which reflections and dust collecting factors are eliminated.

Another object of this invention is to provide an electrostatic pinning method in which dangers of electrical shock to operating personnel are minimized.

Other objects of this invention are to provide an improved device and method of the character described which is easily and economically produced, sturdy in construction, and highly effective and efficient in operation.

With the above and related objects in view, this invention consists of the details of construction and combination of parts as will be more fully understood from the following detailed description when read in conjunction with the accompanying drawing in which:

FIGURE 1 is a perspective view of an electrostatic copyboard and pinning process embodying this invention.

FIGURE 2 is a schematic representation and partly in section of one embodiment of this invention.

FIGURE 3 is a schematic representation and partly in section of another embodiment of this invention.

FIGURES 4A to 4E are schematic representations and partly in section of the steps involved in still another embodiment.

FIGURES 5A to 5H are schematic representations of the steps and theory involved in yet a further embodiment of this invention.

FIGURE 6 is a side sectional representation of still a further embodiment of this invention.

Referring now in greater detail to the drawing in which similar reference characters refer to similar parts, we show an electrostatically pinning copyboard, generally designated as A, upon which an object sheet B is detachably secured for the purpose, as an example, of being photographed by a camera C.

The copyboard A has a general configuration substantially similar to those of conventional construction, and it may have legs 12 and 14 which are adjustable and at the same time sturdy enough to support the object sheet B in a stable manner so that the sheet may be photographed vertically. It is also possible and practical to use the copyboard A in a horizontal plane (not shown), i.e. a table or platform in a manner so that the camera C will be suspended thereabove for taking the photograph from a horizontal position. In fact, the board A may be employed for other purposes than photography, for example, as a chart or map for holding a plurality of plane figures such as a war maneuver plotting board which will visually demonstrate the position of the elements or figures thereupon and permit them to be detachably adhered and displaced on the surface in precise registration with respect to a fixed reference or with each other. Thus, the basic intent of the instant invention is to provide a means for retaining sheets B, including conductive and non-conductive planar figures, title blocks, insets and/or the like upon a surface whereby they can be detachably secured in positive face-to-face contact with the board or with each other as desired.

In FIGURE 2, we show in section one embodiment of our electrostatic copyboard A which comprises a highly conductive plate 16, such as copper or other metal, to the front surface of which is firmly secured by adhesive or the like a non-conductive sheet 18. The sheet 18 is electrically insulative in character and may be a sheet of polyvinyl chloride approximately .030 inch thick or a layer of non-conductive paint or coating applied to the entire front surface of the conductive plate 16.

In FIGURE 2, the plate 16 is electrically connected to a high voltage negative D.C. generator 20 through a switch 22. The high voltage generator 20 may be any conventional electrostatic charging source capable of emitting D.C. charges of approximately 5,000 to 15,000 volts at low amperage. Assuming that a negative charge is applied to the plate 16, the front surface of the non-conductive sheet 18 would have a negative voltage induced thereon as shown in FIGURE 4B. If a neutral sheet B were now to be placed adjacent the front surface of the non-conductive but negatively charged layer 18, it would be only slightly electrostatically attracted thereto and would not stick in face-to-face abutment therewith until positive charges were imposed on said sheet B. When positive charges are applied to sheet B, a much greater attractive force is created.

A further implementation of the FIGURE 2 embodiment thus far discussed involves the further step, after securing of the sheet B to the outer surface of the insulated layer 18, of imposing an additionally positive D.C. charge (or opposite in polarity to that of the generator 20) upon the surface of the sheet B. That is, as shown in FIGURE 4B, the application of the negative D.C. source 20 upon the metal plate 16 causes the surface of the insulative layer to assume a negative voltage. Placing the sheet B on the board A makes the sheet slightly positive, with respect thereto because positive charges are carried through the operator's body to some extent. That is, an operator is never completely insulated from ground. Therefore, wherever his hands touch the sheet B in placing it against the insulator layer 18 to which a negative voltage is applied, the sheet becomes positively charged at the touched points. Hence, the positive parts of the sheet B will stick to the negative insulator layer at those points. The application of the additional or reinforcing positive charge upon the sheet B is produced by an ionizing wand 24 which is connected through hand switch 26 to a positive (+) D.C. high voltage generator 28 (opposite in polarity to the D.C. generator 20). The ionizing wand 24 is essentially a static eliminator, such as is described in the U.S. patent to Simons, No. 2,163,294, upon which an insulated handle 25 containing switch 26 is secured so as to facilitate juxtaposition by hand over the exterior surface of the copyboard A. That is, the wand 24 essentially comprises a conductive cylinder having a conductive rod (not shown) co-axially disposed therein and insulated therefrom. A plurality of conductive needles are affixed to the rod in longitudinally spaced relationship and project outwardly therefrom through apertures in the cylinder. High voltage, of course, is applied across the needles and the cylinder by way of the switch 26 whereby ionization of the air will occur about the needles to produce a charge corresponding to the source 28 utilized. The wand 24 itself is actually brushed over the surface 18, but without touching it, while the switch 26 is closed. After application by the wand 24 of the positive charges, the wand may be removed from the area. The sheet B will be electrostatically seized to the layer 18 even after removal of the high voltage generator 20 (opening switch 22) and the copyboard A will carry a "floating" but "pinning" charge thereon for many days until the charge leaks off.

Still another variation of the FIGURE 2 embodiment involves the reversal of the polarity of the D.C. generators upon both the plate 16 and the wand 24 just so long as the two are opposite in polarity.

Yet another variation of the FIGURE 2 embodiment would be to place the plate 16 at ground potential and apply by means of the wand 24 a D.C. charge of either polarity upon the sheet B. In fact, with this latter installation, an insulating layer 18 is not required at all.

While the various FIGURE 2 embodiments, other than a grounded plate, provide a satisfactory means of electrostatic pinning, it must be recognized that the outer surface of the conductive plate 16 would be bare and "hot" and carry considerable charge thereon even after opening of the switch 22. In order to alleviate somewhat the dangers of electrical shock to personnel, we show in FIGURE 3 a modification copyboard A1.

The copyboard A1 comprises a metal foil 30 or conductive deposition sheathed and/or sandwiched between non-conductive skins 32 and 34 laminated thereabout. A positive or negative D.C. high voltage source is coupled to the foil 30 by way of suitable leads, again through a switch 22. In the illustration set forth in FIGURE 3, a positive (+) voltage is applied to the foil 30 by the positive (+) D.C. high voltage generator 28. The exterior surfaces of the laminated skins 32 and 34 will similarly have induced thereupon a positive (+) voltage. Once more, the wand 24 may have a D.C. source of opposite polarity applied thereto in a manner similar to that described under the FIGURE 2 embodiment. However, we have elected to demonstrate the applicability in FIGURE 3 of an A.C. ionizing source 36 which is coupled to the wand 24 through the switch 26.

When the A.C. high voltage source 36 is connected to the wands 24, it is significant to remember that the wand 24 will be ionizing and emitting both positive (+) and negative (—) charges simultaneously and therefore would effectively be acting as a static neutralizer. It is accordingly recommended that the A.C. ionizing wand 24 be removed from the area before the switch 22 is opened because of its inherent tendency to neutralize any "floating" charges upon the surface of the skin 32. Thus, the A.C. ionizing wand may be first applied to the sheet B itself and neutralize any residual charges thereon prior to its placement against the copyboard A1 (also copyboard A) to which a D.C. charge is or will be applied. Note also that the A.C. ionizing wand can be utilized where the sheet B is already in contact with the D.C. charged surface 32 since there is normally great difficulty in neutralizing charges at the interface between non-conductive sheets in face-to-face abutment. It is also important to note that the use of the A.C. wand causes not only a sticking or pinning effect of the sheet B to the copyboard A or A1 but also creates additionally a definite attractive or pulling effect such as is caused when the sheet B itself is charged or contains residual charges thereon opposite in polarity to the non-conductive layer 18 or 32. However, it is generally desirable to avoid definite pulling forces by the copyboards upon the sheet B since placement in position is usually preferable to uncontrolled tugging. Hence, the sheets should either be neutral or the same polarity as that of the skin 18 or 32 for best control in pinning positionment, and the wand should be used only after the sheet B has been placed in position.

Referring now to FIGURES 4A to 4E inclusive, we show still another modification of our method of electrostatic pinning, which emphasizes the adhesion or pinning effects and reduces as much as possible any likelihood of uncontrolled attractive forces. While the copyboard is illustrated by these figures, it is to be understood that in FIGURES 4A to 4C, at least, the same principles are applicable to copyboard A1.

The first step of the method is exhibited in FIGURE 4A wherein a grounded brush 40 or induction ionizer is first drawn across the surface of layer 18 while the switch 22 from the D.C. source 20 is open thereby neutralizing the board. For example, plate 16 will be grounded when switch 20 is open. Thus, the surface 18 is grounded or neutralized before the application of any charge upon the plate 16. The designation 40 which is given to the grounded "arrow" could also be a grounded roller or similar device to remove residual charges from the surface 18.

With the brush 40 removed from contact, the switch 22 is closed, as shown in FIGURE 4B, whereby a D.C. negative voltage from the generator 20 will be applied to the plate 16. Negative voltage now applied to the conductive plate 16 produces or induces negative voltage at the outer surface of the non-conductive layer 18. If the grounding brush 40 is now applied to the layer 18 again, as shown in FIGURE 4A, but with the switch 22 closed, as shown in FIGURE 4B, the insulating layer 18 will be at ground or zero voltage, except that positive charges will be deposited thereon.

In FIGURE 4C, the switch 22 is opened again for example, we would reground the plate 16 so that the copyboard A will float, and abutment of the sheet B to the face 18 will cause the sheet to be electrostatically pinned thereto without drawing forces.

It is to be observed that since the D.C. source 20 has been removed from direct connection to the plate by opening of the switch 22, a person wearing rubber or insulative soles could touch the surface of the layer 18 during manipulation of the sheet B without receiving an electrical shock. The same is true of the FIGURE 2 and FIGURE 3 embodiments. However, it is to be recognized that the manipulator himself is now charged to the extent that his touching of a grounded object such as the camera release cable may produce a violent discharge.

Accordingly, we provide the additional step of brushing the sheet B with the induction ionizer 40, as shown in FIGURE 4D. Now, the sheet B will be effectively electrostatically pinned to the surface 18. Lastly, since the conductive plate 16 is grounded at 42, the copyboard A is a "floating" capacitor with the only charges at the interface between sheet B and layer 18 and between the plate 16 and the insulative layer 18. These interfacial charges are bonded together as "electret" couplings, as shown in FIGURE 4E. While the shock danger has now been eliminated, the "electret" bonds are sufficient to both permit and cause electrostatic pinning of the sheet B to the copyboard A without creating undesirable attractive tugging.

Referring now in detail to FIGURES 5A to 5H inclusive, we show still another method embodiment of our invention and illustrate the theoretical considerations underyling its operation. Basically, this method employs a copyboard A2 which includes a rigid baseplate 50 made of an insulating material of high dielectric strength, such as a polyvinyl chloride composition, for example. A highly conductive sheet 52, which may be copper foil, is abutted against one face of the baseplate 50 and sandwiched between it and a thin insulating layer 54 of a material having high dielectric properties, again for example a polyvinyl chloride composition. The conductive layer 52 is smaller in plan area than both the baseplate 50 and the insulating layer 54 so that its margins are peripherally bounded and encapsulated thereby. Thus, when a high voltage is applied to the conductive layer 52 by a D.C. voltage generating source 20, there will be no arcing from the conducting foil 52 to the periphery of the copyboard A2 sandwich. The dielectric strength of the baseplate 50 and the insulating layer 54 must of course be sufficiently great to prevent any breakdown from the conductor 52 to any grounded parts upon which the copyboard A2 may be mounted, i.e.—the legs 12 and 14 or a suitable easel, and also to avoid actual dielectric breakdown of the insulating layer 54 when, as will be described hereinafter, a grounding brush is moved thereagainst. The insulating layer 54 may have a white front face together with, if desired, regularly spaced horizontal and vertical black lines thereon (not shown) to facilitate registration of sheets B with the camera or with each other.

The D.C. generator 20 applies a high magnitude of D.C. voltage (approximately 15,000 volts) to the conductor 52 through an insulated cable 56. The D.C. generator 20 may either be of positive polarity or of a negative polarity. In the examples shown in FIGURES 5A to 5H inclusive, a negative D.C. generator is demonstrated simply for purpose of illustration. The crosssections of these FIGURES 5A to 5H are enlarged and exaggerated, and in addition, cross-hatching has been excluded in order to clearly demonstrate the theoretical relative charging as well as the polarization of these charges within the system during each phase.

As shown in FIGURE 5A, the switch 22 is open, and before any voltage is applied to the conductor 52, the molecules of the insulating layer 54, as well as the baseplate 50 and the conductor 52, are unpolarized and the charges therein will be distributed at random throughout and exhibit an effective neutral charge condition. In FIGURE 5B, when the switch 22 is closed and, in this case, a negative D.C. voltage applied to the conductor 52, the molecules of the insulating layer 54 become polarized so that their positive nuclei are drawn toward the highly negatively charged conductor 52, and the negative portions in the insulating layer 54 directed away from the conductor toward the exterior (right hand surface) face of the insulating layer. In addition, there will be an excess of negative charges in the insulating layer 54 as a result of negative charges leaking thereto from the conductor 52.

Just placing a sheet B of paper, cardboard or any insulative material on the surface of the insulating layer 54 will cause the sheet B also to polarize plus to minus from left to right as shown in FIGURE 5C. The sheet B will stick to the face of the layer 54 with a fair degree of attraction since the layer 54 at this stage is predominately negative and the sheet B is initially at least neutral. However, if the surface of the sheet B is while in contact with the insulating layer 54 rubbed with a ground brush 58, as shown in FIGURE 5D, or the operator's hand (less efficient), some of the electrons or negative charges on the surface of the sheet B will be removed (passed to ground) leaving the sheet B charged with a net positive charge. The net positive charge on the sheet B will now cause it to be strongly attracted toward the negative conductor 52 so that the sheet B is now pinned to the face of the layer 54 with a large degree of force.

It is to be noted that during the previous steps 5B, 5C, and 5D, the negative high voltage has been applied to the conductor 52. Now, in the course of normal practice, the sheet B may and usually is repeatedly removed and replaced against the surface 54 in order to obtain a fine degree of registration with the camera C or with respect to other sheets B. This operation is performed with the switch 22 closed and high voltage applied. However, each time the sheet B is removed, some of the negative charges on the front surface of the layer 54 are removed with the sheet. The sheet B itself is to a degree neutralized as it is manipulated by hand when out of contact with the copyboard. Thus, as the sheet B is successively removed and abutted against the copyboard A2, the insulating layer 54 will each time have lost some of its negative charges and gradually become positively charged. This positive charge in and on the layer 54 will tend to counteract the attractive force of the negatively charged conductor 52, and successively diminish the net negative charge on the face of the copyboard. Finally, the successive placement of sheets B on the copyboard to the conductor of which is applied the negative D.C. voltage will no longer permit sticking of the sheets B to the layer 54. This condition is shown in FIGURE 5E wherein the net effect of the negative conductor 52 and the now positively charged insulating layer 54 is zero from the outside. Note sheet B is not now polarized.

When the sheets B no longer stick in position against the insulated skin 54, the switch 22 is opened so that the D.C. negative voltage is removed from the conductor 52. See FIGURE 5F. Opening the switch 22 effectively places the conductor at ground through the 50 megohm resistor. Since the insulating skin 54 is a poor conductor, it will remain positively charged and the net effect at its exterior surface will be positive.

Now just placing the sheet B against the positively charged floating copyboard surface will cause the sheet to polarize minus to plus from inside to outside as shown in FIGURE 5G. When the sheet B is further wiped with tre grounding brush 58 or the manipulator's hand, it will additionally acquire electrons from ground to place the sheet with a net charge of negative polarity which will cause it to be strongly attracted to the positively charged insulating layer. See FIGURE 5H.

As the sheets B are now successively placed upon the grounded copyboard A2 with its open switch, they will be wiped and leave some of their excess electrons on the surface of the insulating layer 54. As the insulating skin 54 accumulates electrons, its now positive charge will be diminished until it will no longer have the ability to polarize sheets placed upon the copyboard. At this stage, the insulating layer 54 also unpolarizes and reverts to its initial condition as shown in FIGURE 5A. Closing the switch 22 will permit the cycle to be repeated so that the sheets will again stick.

It is to be noted that the cycling method shown in FIGURES 5A to 5H is dependent upon successive placement of sheets B upon the skin 54 of the copyboard A2 so as to "wipe" electrons from or upon those areas. In those areas of the skin 54 which have not been utilized, sticking or pinning action may not be satisfactory after switching (opening or closing of the switch 22). This deficiency is corrected by grounding the entire surface of the insulating skin 54 before switching the voltage to the conductive plate 52 to "ON" and before grounding the conductive layer 52.

As has been amply set forth above in FIGURES 4A to 4E and 5A to 5H, the sheets or pieces B which are to be pinned to the copyboard are wiped with a grounding brush 40 or 58 whose metallic bristles are coupled to ground while the pieces B are in contact with the copyboard's insulated skin. This can also be accomplished by the operator if he is properly grounded, namely by standing upon a conductive grounded flooring, simply by rubbing his hand over the sheets B. In any event, when the operator touches the copyboard, he will, to the extent that he is grounded, be the second plate of a condenser or capacitor in which the first plate is the charged conductor 16 or 52 and the dielectric is the insulated skin 18 or 54. Transient currents accordingly will flow and subject the operator to an electric shock of varying magnitude depending upon the voltage on the conductor, and the thickness and dielectric constant of the insulating skin. Because the effectiveness of the system depends upon a high voltage (15,000 volts) and a thin insulating layer 54, approximately 10 mils, the shock that an operator would receive may tend to be unpleasant even though the amperage is low.

Shock to personnel can be minimized and virtually eliminated by using the same total thickness of insulating layers but separating it into two layers of lesser thickness. Between the two insulating layers is sandwiched a third layer which is very slightly conductive (a high resistivity in the neighborhood of $10^{10}$ ohms per square foot as compared to at least $10^{13}$ for the insulator layers). The intermediate conductivity of the laminate decreases the magnitude of the transient currents which flow when the operator touches the board and prevents him from becoming shocked.

Referring now to FIGURE 6, there is shown another modification of A3 of our copyboard. The copyboard A3 comprises a vinyl baseplate 60 against one face of which is secured a highly conductive sheet 62 of copper foil, the latter again having a smaller plan configuration than the baseplate. A layer of insulating material 64 having the same area plan as the baseplate 60 overlies the latter and sandwiches the copper sheet 62 therebetween. The insulating layer 64 may be a polyester film, such as that sold under the name "Mylar," having a thickness, for example, of 5 mils and a resistivity of $3.2 \times 10^{13}$ ohms per square foot. Superimposed over the "Mylar" insulating layer 64 is now a semi-conductive film 66 having a thickness of 5 mils and a resistivity of $1.4 \times 10^{10}$ ohms per square centimeter. Such a semi-conductive film 66 is formed by compounding a vinyl composition with a fine carbon black to afford slightly greater conductivity characteristics. Finally, a top insulating skin 68 of white polyvinyl chloride, 10 mils thick, is secured over the face of the semi-conductive film 66. Lastly, a D.C. high voltage supply 70, for example, a positive full wave rectifier producing 15,000 volts, is coupled to the conductive foil 62 through cable 56 and switch 22.

The mode of operation of the copyboard A3 is substantially identical to that of copyboard A2. Accordingly, the detailed steps involved have not been repeated in the drawings. FIGURE 6 therefore is the sole representation of the copyboard A3 and is illustrative of the copyboard A2 step shown in FIGURE 5D, except that a positive (+) D.C. generator is employed. Note that the lessened resistance of the semi-conductive layer 66 will reduce the size of magnitude of transient currents during grounding and thus avoids shock to personnel. However, while the slight conductivity of the semi-conductive film 66 as an intermediate layer negatives its presence as far as high voltage charging effects are concerned, polarization of this semi-conductive layer is virtually one hundred percent. Therefore, the pieces B would not "see" the thickness of the intermediate semi-conductive layer and the efficacy of pinning is not impaired in any way.

As is apparent from the foregoing description, the electrostatic pinning method and apparatus of the instant invention eliminates the need for transparent overlays thereby avoiding unnecessary reflections and dust collecting surfaces which ordinarily interfere with photographic resolution and quality. Furthermore, the sheet B which is to be photographically copied, for example, will stick immediately and will not slide as would be the likelihood under a glass overlay. The sheet B is easily adjusted in position with full access to maneuverability and can be accommodated in either vertical or horizontal planes. In addition, the electrostatic pinning of the sheet B or sheets thereof can be effected either by first charging the copyboard and then applying the sheet or the sheets can be placed upon the neutral copyboard and then pinned by subsequent application of the electrostatic charge.

Lastly, it is to be noted that the copyboard of the instant invention is not limited to the pinning of a single layer of pieces B on its surface. A number of layers of pieces or sheets B may be superimposed on one another and still held firmly in place. While not shown in the drawings, it is evident that the foregoing laminated feature may be employed to make a complete mock-up as used in the newspaper trade. That is, first pinning a sheet of film, such as "Mylar" to the copyboard, superimposing a plurality of pieces B to be photographed in their proper position upon the sheet film, and then removing the sheet film and the pieces B as a package. These pieces will now remain pinned to the sheet film. If desired, a second transparent film may then be placed over the pieces pinned to the first sheet film to form a removable but firmly formed sandwich.

Although this invention has been described in considerable detail, such description is intended as being illustrative rather than limiting since the invention may be variously embodied, and the scope of the invention is to be determined as claimed.

We claim as our invention:

1. An electrostatic copyboard comprising a conductive plate, a non-conductive skin on said plate, means for applying a high D.C. voltage to said conductive plate so that the outer face of said skin will have a voltage induced thereon of the same polarity as said high D.C. voltage, means for abutting a sheet against said non-conductive skin, and air ionizing means in spaced juxtaposition with said skin and comprising a multi-pointed wand having a high voltage A.C. potential applied thereto whereby the sheet may be pinned with controlled static forces.

2. A method for electrostatically pinning articles comprising the steps of applying a high D.C. voltage to a conductive plate having a non-conductive skin on at least one face thereof, abutting an article against the non-conductive skin, and inducing in said article a charge opposite to polarity to that induced in said skin by juxtaposing in spaced disposition thereto a high voltage A.C. air ionizing source.

3. A method for electrostatically pinning articles comprising the steps of applying a high voltage D.C. potential upon a conductive plate having a non-conductive skin on at least one face thereof, successively abutting the articles against the skin and wiping each article with a grounding means on each successive abutment thereof so long as said articles stick to said skin, and when said articles no longer stick to said skin removing said high voltage D.C. potential from said conductive plate and grounding said plate, and then successively abutting the articles against the skin and wiping each article with a grounding means with each of said last mentioned successive abutments so long as the articles stick to the skin.

4. The invention of claim 3 including the additional steps of reapplying the high voltage to said conductive plate when the articles no longer stick to the skin with the plate grounded, and thereafter repeating the cycle.

5. A method for electrostatically pinning articles comprising the steps of:
 (a) applying one side of a high voltage D.C. source to a conductive surface having a non-conductive skin,
 (b) successively abutting articles against the non-conductive skin and with each abutment providing a conductive path between said articles and the other side of said high voltage D.C. source so long as said articles continue to be pinned to said skin, and
 (c) when articles will no longer adhere to said skin then removing the first mentioned side of the high voltage D.C. source from said conductive surface and connecting the second mentioned side of said high voltage D.C. source to said conductive surface, and
 (d) successively abutting articles against said skin and providing a conductive path between the articles and the second mentioned side of said high voltage D.C. source so long as the articles continue to be pinned to said skin.

6. The method of claim 5 including the additional steps of repeating steps (a) and (b) when articles will no longer adhere when steps (c) and (d) are applied, and thereafter repeating the cycle.

7. The method of claim 5 wherein the second mentioned side of said high voltage D.C. source is connected to ground.

References Cited
UNITED STATES PATENTS

| | | | |
|---|---|---|---|
| 2,742,814 | 4/1956 | Gage | 88—24 |
| 2,897,425 | 7/1959 | Waring | 317—262 |
| 3,273,301 | 9/1966 | Anderson | 317—3 X |
| 2,834,132 | 5/1958 | Taylor et al. | 40—125 |

LEE T. HIX, *Primary Examiner.*

MILTON O. HIRSHFIELD, *Examiner.*

UNITED STATES PATENT OFFICE
CERTIFICATE OF CORRECTION

Patent No. 3,359,469 December 19, 1967

Warren W. Levy et al.

It is hereby certified that error appears in the above numbered patent requiring correction and that the said Letters Patent should read as corrected below.

Column 8, line 71, for "to", first occurrence, read -- in --.

Signed and sealed this 4th day of March 1969.

(SEAL)
Attest:

Edward M. Fletcher, Jr.
Attesting Officer

EDWARD J. BRENNER
Commissioner of Patents